April 10, 1934.　　　H. G. DEWEY ET AL　　　1,954,349
METHOD AND APPARATUS FOR AUTOMATICALLY ACTUATING
MACHINES FOR FILM BACKING PAPERS
Filed Aug. 24, 1929　　　5 Sheets-Sheet 1

Haywood G. Dewey & Arthur L. Schoen
INVENTORS,

BY

ATTORNEYS.

FIG_7_

April 10, 1934.  H. G. DEWEY ET AL  1,954,349
METHOD AND APPARATUS FOR AUTOMATICALLY ACTUATING
MACHINES FOR FILM BACKING PAPERS
Filed Aug. 24, 1929   5 Sheets-Sheet 4

Inventor,
Haywood G. Dewey & Arthur L. Schoen,
By
Attorney

Patented Apr. 10, 1934

1,954,349

UNITED STATES PATENT OFFICE 1,954,349

METHOD AND APPARATUS FOR AUTOMATICALLY ACTUATING MACHINES FOR FILM BACKING PAPERS

Haywood G. Dewey and Arthur L. Schoen, Rochester, N. Y., assignors to Eastman Kodak Company, Rochester, N. Y., a corporation of New York Application August 24, 1929, Serial No. 388,183

11 Claims. (Cl. 164—49)

This invention relates to machines for preparing strip material and more particularly to machines for automatically punching and slitting backing paper for photographic film. One object of our invention is to provide a machine which will prepare the film backing paper in accordance with printing on the backing paper. Another object of our invention is to prepare a wide sheet of paper with the necessary printing and to provide a machine which will automatically shape the paper strips in accordance with the printing. Still another object of our invention is to provide a paper strip with designating lines or dots which alter the reflection characteristics of the paper and to provide a machine with a light sensitive cell arranged to perform operations upon the strip material actuated through the dots or lines. Other objects will appear from the following specification, the novel features being particularly pointed out in the claims at the end thereof.

It is customary in preparing film backing paper or, as it is sometimes called, the protective covering of the film, by printing wide sheets of paper with the necessary designating marks and then afterwards slitting the wide sheet into strips of the desired width and punching the paper so as to provide the necessary tapered ends at both ends of the separate strips.

Considerable difficulty has heretofore arisen because of the expansion, contraction and variation in thickness of the paper. Since the length of the printed material might change through considerable limits after printing and since the thickness of the paper is not strictly uniform it has been practically impossible to provide a mechanical measuring device which would care for these variations and which would be made to punch out and shape the ends of the separate paper strips in the proper place with respect to the printing.

Our invention is directed to provide a successful means for shaping the paper strips entirely automatically and accurately, in accordance with the printing, irrespective of variations in the paper which tend to alter the length or thickness of the material. In a copending application for Film backing paper preparing machine filed August 17, 1929 in the name of John G. Jones and Haywood G. Dewey, Serial Number 386,692 a machine for making film backing papers is disclosed which is adjusted manually, or which may be run for short periods alone. Our present invention is for an improvement over the machine shown in this application in that in our present invention a light controlled clutch trip operating device is employed.

Coming now to the drawings wherein like reference characters denote like parts throughout.

A machine constructed in accordance with our invention operates entirely automatically the clutches necessary to cause a machine to function which slits a plurality of strips from a broad sheet of paper and punches out the ends of the separate strips in accordance with the printing on the paper. The punching operation, together with an operation for pasting a paster on each strip is actuated by light sensitive photoelectric cell which causes the machine to function through an alteration in the reflection characteristics of the paper.

Figures 1, 2:
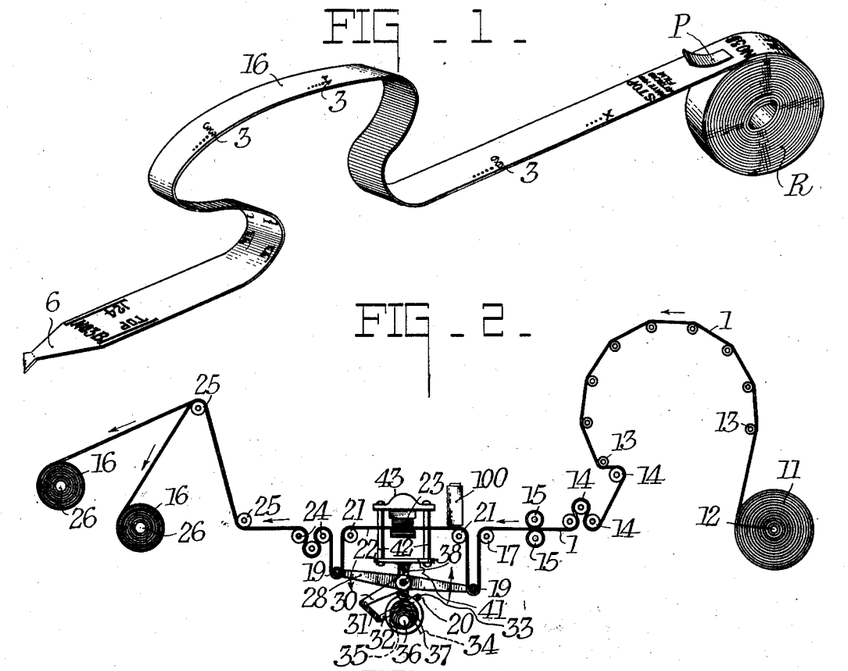
Fig. 1 is a perspective view of a completed roll of film backing papers such as may be turned out by a machine constructed in accordance with and embodying a preferred form of our invention.
Fig. 2 is a schematic showing of a side elevation of the more essential parts of a film backing paper preparing machine on which our improved light control is mounted.
Figure 3:
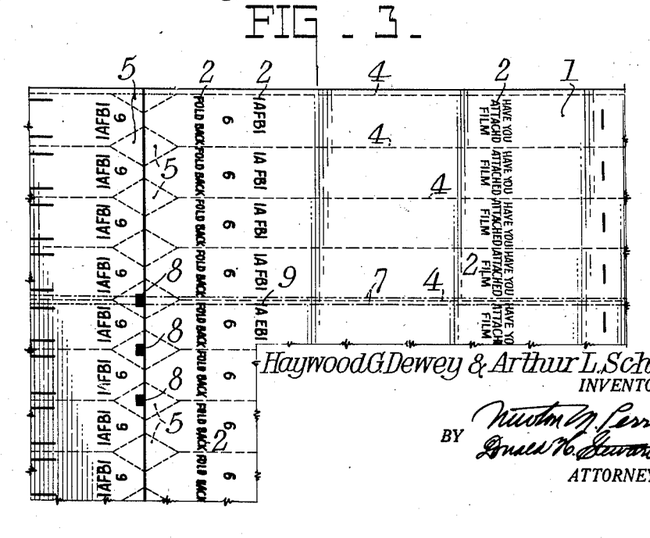
Fig. 3 is a plan view of a portion of a wide sheet of paper from which the strips of Fig. 1 are to be prepared, the sheet showing a portion of the printing normally appearing on the wide paper strip together with the lines or dots which are used to actuate our light control.

As shown in Fig. 3 a broad strip of paper 1 may be printed with a series of legends 2 and may be provided with numerals 3 as shown in Fig. 1 for indicating in a camera the different exposure areas of a film.

The machine on which our tripping device is placed is designed to slit the broad paper band 1 along the lines 4 to divide it into separate strips of the desired width and, in the form shown in Fig. 3, to punch out triangular shaped or diamond shaped areas 5 so as to provide tapered ends 6, as shown in Fig. 1, which facilitate threading the paper strips on to the usual type of film spools. For full details of the machine reference can be had to the copending application above referred to.

In the preferred form of our invention wherein an ink of any desirable color is employed it is entirely immaterial what printing is placed on the wide paper bands or how it is arranged, except that, as shown in Fig. 3, certain areas of the paper may be substantially free from a large solid area of printing, such an area being indicated by the dash and dot lines 7.

It should be noted that in one place on the paper band, here shown as 8, a series of printed spots appear. These spots should entirely cover a portion of an area lying between the lines 7 so that when one of these spots comes to a predetermined position it will alter the reflection characteristics of the paper 1 to such an extent that certain operations to be hereinafter more fully described will be performed on the paper sheet.

If there is no objection to using two or more colors for printing the printing may be of one color and the printing of the areas to be hereinafter more fully described may be of a different color from that of the printing so that there will be a difference in the reflection characteristics between the two sets of printing. If this is done the printing 2 may extend entirely over the sheet if required, it being only necessary to provide the area 8 of a color and of such a size that it will have sufficient difference in reflection value to cause a light sensitive cell to function.

The method and apparatus of the present invention are particularly applicable, as previously stated, to perform their functions with respect to film backing paper. It is a necessary characteristic of backing paper for film that it be completely or substantially opaque to prevent light fog of the film and, therefore, the reflection characteristics of the opaque backing paper must be utilized for operation of the light sensitive cell as distinguished from the use of light transmitted through the paper for that purpose.

"Reflection characteristics", as used in this specification and in the claims is broad enough to cover any change in light rays due to intensity, color or distribution in which some or all of the light rays are reflected.

In the present instance we have found that a black dot 8 on a red backing paper is entirely satisfactory. Other combinations differing in reflection characteristics are obviously equally suitable so that we are not limiting this application to any particular colors or degrees of difference in the reflection characteristics of the materials used.

Figure 9:
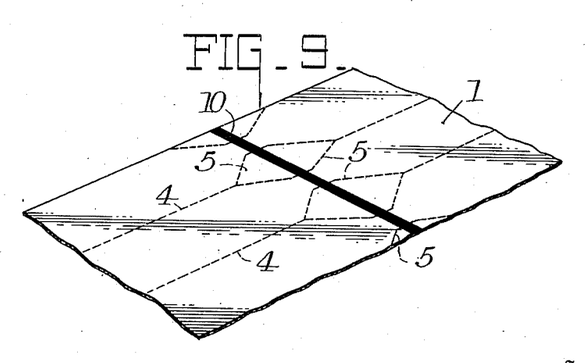
Fig. 9 is a perspective view of a different shaped film backing paper end.

As will be noted from Fig. 3 if printing, such as the numeral 1 indicated at 9, should appear within the lines 7, the darkened area will be so small that the reflection characteristics of the paper strip will not be sufficiently altered to cause the machine to function. If desired, instead of dots 8, any one of which may be used to trip the machine, a line, such as shown at 10, Fig. 9, may be employed and this line may extend across the entire paper sheet, in which case it will be immaterial where the photoelectric cell is placed with respect to the width of the sheet.

In Fig. 2 there is shown a diagrammatic view of a machine for preparing the film backing paper on which our tripping device may be placed. A wide strip of paper 1, which has been previously printed with suitable legends, is mounted in a roll 11 upon a spindle 12 from which the paper strip is drawn over a series of rollers 13 and a series of driven rollers 14. The rollers 13 form what is sometimes known as a "turtle back" and this part of the machine forms no part of our present invention except that it is used to properly direct the paper strip to the strip preparing mechanism.

After being placed under the proper tension by means of rollers 14 the paper strip 1 passes through a plurality of slitting devices 15 here shown as rotary knives. These knives are spaced apart, of course, a distance equal to the width of the completed strip 16 shown in Fig. 1.

From the slitting device the paper passes over a roller 17, thence over a roller 19 which forms a part of a compensating mechanism designated broadly as 20. Guide rollers 21 support a length of paper 22 in position for a chopper 23 to operate at pre-determined intervals, and after passing over the last roller 21 the paper is looped over a second roller 19 of the compensating mechanism 20.

From this roller the paper passes over a series of guide rollers 24 and is stretched between a pair of guide rollers 25. After passing over guide roller 25 the separate strips 16 which have been slitted, shaped, but not cut apart, are wound up upon separate mandrels 26.

After the paper strip 1 has been slitted to provide a series of strips 16, the paper passes to the compensating mechanism 20 so that a portion of the paper strip which is moved continuously through this machine as a whole may be momentarily held still for the punching or shaping operation.

The compensating mechanism, as indicated in Figure 2, comprises a pair of rollers 19 mounted on the ends of a walking beam 28 which is carried by a shaft 29 which can be rocked through the arm 30, link 31 and arm 32.

Figure 10:
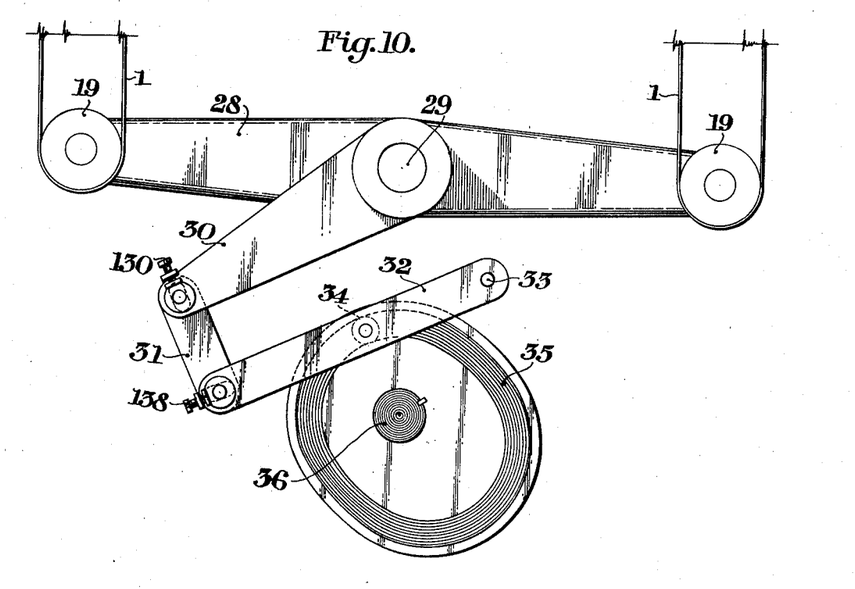
Fig. 10 is a fragmentary side elevation showing the walking beam operating mechanism.

Referring to Figure 10 this mechanism functions as follows: the arm 32 is pivotally supported at 33 and carries a roller 34 intermediately located and which contacts with a cam 35, this cam being on and moved by a power shaft 36.

An adjustment 130 may be made for varying the relation of arm 30 and link 31 and a second adjustment 138 permits an adjustment of link 31 relative to arm 32. These two adjustments, after once being made to secure the proper operation of the walking beam 28, need no further attention.

The paper strip is moving continuously through the machine in the direction shown by the arrows, Figure 2.

In order to momentarily hold the paper still for the shaping operation of the ends the walking beam 28 is moved by the mechanism above described a sufficient distance in the direction opposite to that shown by the arrows, Figure 2, to momentarily hold that portion of the strip, which lies between rollers 21, still. After holding it still the walking beam moves in the direction of the arrows causing an acceleration in the speed of the paper over rollers 21.

Figure 7:
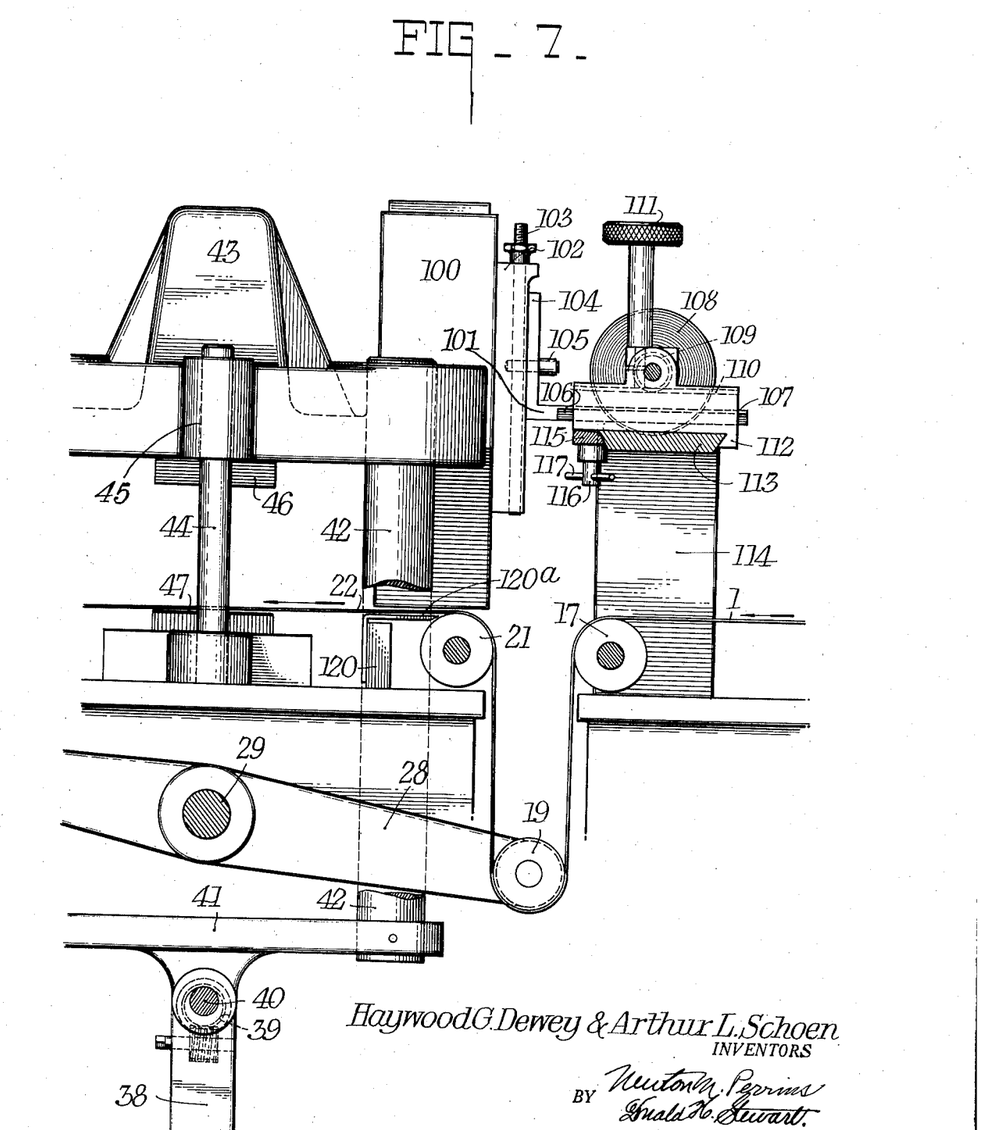
Fig. 7 is a fragmentary enlarged side elevation showing a portion of the walking beam and associated mechanism.
Figure 8:
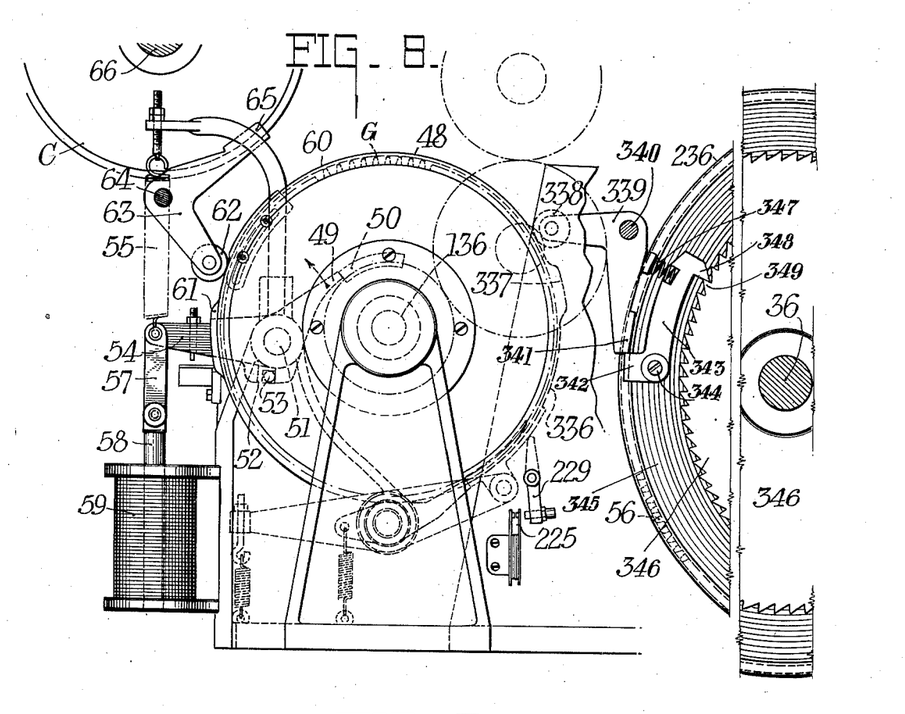
Fig. 8 is a fragmentary side elevation of the clutch tripping device, together with the timing shaft.

In order to shape the ends of the film backing paper strips during the moment of rest of the paper, the chopper shown in Figure 7 is operated in the following manner:

The chopper clutch shaft 36 is provided with a standard type of kick-out clutch 236, see Fig. 8, adapted to make one revolution and then stop. This shaft 36 also carries eccentrics 37, see Fig. 2, which are connected by arms 38 to eccentric bearings 39, see Fig. 7, on the shaft 40. The shaft 40 supports cross heads 41 to which are attached at each end the upwardly extending rods 42 which move the punch head 43 as is diagrammatically indicated in Fig. 2.

As best shown in Fig. 2 the punch head 43 may be guided on rods 44 which pass through bearings 45. At each revolution of the chopper shaft 36 the eccentric 37 causes the punch 43 to function.

The shaping or chopping is performed by a series of punches 46 of the proper shape and spacing, these punches cooperating with dies 47 which lie just beneath the paper strip 1. Each time the punch head 43 is lowered by the rods 42, the ends of all the strips are simultaneously shaped.

As will appear from the above description, each time the chopper clutch shaft 36 makes a single rotation the walking beam is operated to hold the paper momentarily stationary and the punching device cuts out the ends of the various strips during the time that the paper remains still.

The timing shaft 136, see Fig. 8, may be operated a revolution at a time by means of a standard type of kick-out clutch, this clutch being shown at 48. As any well known type of clutch may be used for this purpose, it will not be here fully described. The timing shaft 136 carries a cam 336 provided with a lug 337 which engages with roll 338 on a bell crank lever 339 and trips the chopper clutch 236 at a predetermined time dependent on the setting of the cam 336.

Clutch 236 is of a well known type in which a lever 339 pivoted at 340 and terminating in an arm 341 is the tripping member adapted to engage an arm 342 of a bell crank lever 343 pivoted at 344 to a clutch member 345 which normally idles on shaft 36. The driven clutch member is the toothed disc 346. A spring 347 pushes the latch 348 of the bell crank lever 343 into engagement with a tooth 349 of the driven clutch member and when the latch and a tooth 349 are so engaged the normally idling clutch member 345 will be driven one or more revolutions until arms 341 disengage latch 348.

The complete train of driving mechanism is shown in the application referred to on page 2, Serial No. 286,692, this application being for an improvement over the application shown therein.

The timing shaft mechanism is shown in Fig. 8 wherein the dog 49 engages lug 50 and forms a part of the clutch. The dog 49 is supported on a shaft 51 and movement thereon is limited by a notch 52 engaging a square bolt 53.

This movement is sufficient to permit the dog 49 to raise up over the top of the lug 50 by moving in the direction shown by the arrow. The dog is in the form of a bell crank lever having end 54 which is held normally by a spring 55 in such a position that the dog engages the lug 50. In this position the shaft 136 is held stationary while the power driven gear G continues to rotate. When the clutch is tripped, that is, when the dog 49 is moved out of the path of lug 50 by means of link 57 and the core 58 of the solenoid 59, shaft 136 is caused to rotate once and then stop since after each actuation dog 49 again moves into the path of lug 50.

It should be noted that chopper clutch shaft 36 carries the cams which operate the walking beam and punching mechanism.

In addition to tripping the chopper, timing shaft 136 also carries another cam member 60 which has a raised portion 61. The periphery of this cam is adapted to be engaged by a roller 62 carried by the bell crank lever 63 pivoted at 64 to a fixed support and having a free end 65 adapted to operate a clutch C, which, like clutch 48, is adapted to permit a single revolution of a shaft and then stop. The shaft 66 is operated through this one revolution of clutch C (which may be of any well known kind) and is best shown in Fig. 8. This shaft carries a number of cams which are adapted to operate the paster applying mechanism, which is not herein described as it forms no part of the present invention.

It should be noted that all this mechanism is actuated by the solenoid 59 and it is to the means for automatically actuating the solenoid that our invention is particularly directed. In order to energize the solenoid for this purpose the following light sensitive electric cell actuating mechanism is employed.

There is a housing 100, as indicated in Figs. 2, 4, 5 and 7 which carries the light sensitive cell and the amplifying circuit.

As best shown in Fig. 7 the housing 100 is supported by a bracket 101 which may be vertically adjusted by means of a nut 102 and screw 103. This bracket has slidable connection with a support 104 and may be readily removed from the support by withdrawing a spring plug 105. The support 104 has inwardly bevelled rails 106 which slide freely in a slideway 107 and the position of the bracket relative to the slideway can be adjusted by a hand wheel 108 adapted to actuate a gear 109 meshing with a rack 110. A set screw 111 is for holding the parts in an adjusted position.

The slideway 107 is cut in a slidable member 112, this member being adapted to move on a bevelled track 113, which may be supported on each side of the machine base by means of uprights 114. Thus the supports 114 and the track 113 form a kind of bridge extending entirely across the machine and the paper 1 passes between the uprights 114. In order to hold the member 112 in desired position on the track 113 there is a clamping block 115 which, by means of a screw 116, controlled by handle 117, may be tightened to bind member 112 upon the track.

Figure 4:
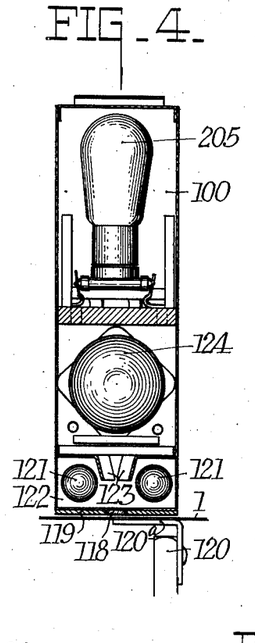
Fig. 4 is a section on line 9—9 of Fig. 5 through a lamp housing used on our machine.
Figure 5:
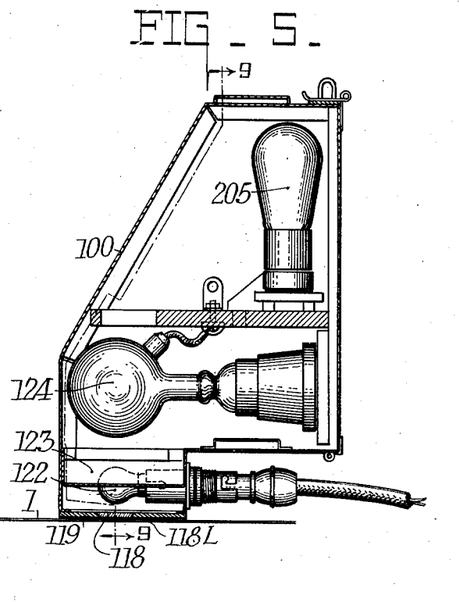
Fig. 5 is a sectional view through the lamp housing taken at 90° from the view shown in Fig. 4.

In the lower portion of the housing 100, as best shown in Figures 4 and 5 there is a small window 118, this window preferably being of greater dimensions in one direction than in the other although this is not necessary.

The window 118 is provided in the bottom wall 119 so that it lies close to the paper 1 and there is a support 120a carried by a post 120 adapted to hold the paper close to the window and prevent it from sagging. The window is covered in this instance with a light filter 118L of red color to increase the contrast between the red backing paper and the bluish-black ink marks 8 and to obtain the maximum response of the light sensitive cell. The filter is selected for the particular colors used for the strip material and ink used although of course with some material, such as white with black spots, no filter would be required.

Since the paper 1 is held close to the window 118 that portion lying close to the bottom wall 119 is illuminated solely by the lamps 121, a pair of these lamps being situated in an offset 122 of the housing. Baffle plates 123 prevent direct rays from these lamps from going to the light sensitive cell 124.

As long as the paper passes beneath window 118 without a material change in its reflection characteristics the machine will not function but when one of the black dots 8 indicated in Figure 3 or a black line such as 10 indicated in Figure 7 comes opposite the window 118 the reflection characteristics are materially altered and the amount of light passing from the lamps to the paper and back to the light sensitive cell 124 is altered. This alteration causes the machine to function in the following manner:

Paper 1 passing beneath the window 118 is illuminated solely by the lamps 121 and when the machine is operating the lamps burn continuously. Light from these lamps is reflected by the paper to the light sensitive cell 124. This cell may be of the cæsium type.

Figure 6:
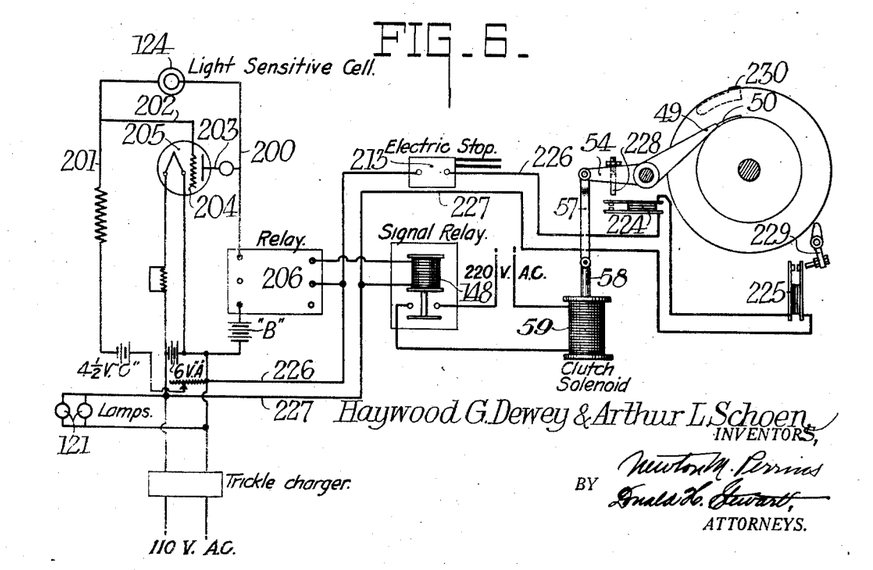
Fig. 6 is a wiring diagram showing the clutch and the operated clutch tripping mechanism.

As long as a constant light is reflected to cell 124 the machine parts do not function, but when the reflection characteristics of the paper 1 are varied, as by a line 10 or dot 8 the machine functions for the following reasons:

There is a negative potential on wire 201 against which a positive potential over wire 200 through cell 124 may act so long as cell 124 receives sufficient reflected light rays. But when a spot greatly reduces the reflected light rays, as by a dot, the resistance of the light cell increases, the grid becomes more negative and this negative bias decreases the current through the relay 206 and causes it to function.

Relay 206 is of the type which makes a circuit through a predetermined drop in transmitted current as may be caused as above described by a spot 8 on the paper strip 1. This relay causes the signal relay 148 to function to make the main circuit (here shown as 220 V. A. C.) to cause the clutch solenoid 48 to function.

As soon as the paper 1 is shaped it is moved by the compensator and the black dot is no longer beneath the window 118 so that the sensitive cell 124 again passes sufficient positive potential to prevent the negative C battery biasing potential from making the grid negative enough to operate the relay 206.

In other words, as soon as the black spot passes window 118 the grid 204 immediately becomes more positive, the current through the relay increases, and this increase will, by relay 206, break the circuit passing to the signal relay 148.

While not essential we prefer to provide an electric stop 213 for stopping the entire machine in case a lamp 121 burns out, or in case the light sensitive cell 124 should fail to function. This may be provided in the following manner:

A pair of contacts 224 and 225 are arranged on a circuit composed of wires 226, 227, the former of which goes through and forms the actuating coil of electric stop 213. Contact 224 may be made by post 228 each time the clutch is tripped and contact 225 may be made through lever 229 when struck by cam 230 which rotates with the clutch member 48. When both contacts are made electric stop 213 stops the entire machine.

Suppose a lamp 121 should burn out; this would cause grid 204 to become more negative and operate relay 206 because the reflection characteristics of the paper 1 would drop. This would actuate relay 148, energize solenoid 59 and operate clutch 48, but since the paper could not reflect enough light from one lamp, cell 124 would not again pass enough current to buck the negative potential of 202 so the solenoid 49 would remain energized holding contact 224 closed.

As soon as clutch 48 carries cam 230 about 180° or until it strikes 229, contact 225 will close actuating the electric stop 213 thus preventing power from passing to the machine.

Exactly the same result will follow where the light sensitive cell fails. The relay 206 will be energized by grid 204 becoming more negative and thus permit the clutch dog 49 to be released so that contacts 224 and 225 may make the electric stop circuit.

Thus a means is provided which will prevent the machine from spoiling any considerable amount of paper through failure of the electrical system.

Having thus described our invention, what we claim as new and desire to secure by Letters Patent is:

1. In a machine for preparing strip material which has a plurality of markings, the combination with an advancing means for continuously moving said strip material, and a compensating means normally inoperative but adapted upon operation to stop a portion of said strip material, of a light responsive means for controlling the operation of said compensating means and arranged to be operated by the presence of said markings in a predetermined position.

2. In a machine for preparing strip material which has a plurality of markings, the combination with an advancing means for continuously moving said strip material, and a compensating means normally inoperative but having a definite cycle of operation intermittently to maintain a portion of said strip material stationary, of a light responsive means for starting the cyclic operation of said compensating means and located to be operated by the presence of said markings in a predetermined position.

3. In a machine for preparing strip material which has a plurality of markings, the combination with an advancing means for continuously moving said strip material, a compensating means normally inoperative but having a definite cycle of operation to maintain a portion of said strip material stationary, and a mechanism for performing an operation upon said stationary portion of said strip material during the operating cycle of said compensating means, of a light responsive means for starting the cyclic operation of said compensating means and located to be operated by the presence of said markings in a predetermined position.

4. In a machine for preparing strip material having markings which may vary in dimensions and location thereon, the combination with an advancing means for continuously moving said strip material, a compensating means for intermittently stopping a portion of said strip material and a means for performing an operation on the intermittently stationary portion of said strip material, of a control means for operating the two last mentioned means in timed relation and a light sensitive means adjacent said strip material, operated by the markings on said strip material and actuating said control means whereby the strip material is stopped and the operation performed thereon while stationary and in definite relation to said markings.

5. In a machine for preparing strip material, the combination with slitting and shaping mechanism, of a means for continuously moving strip material through the machine said strip material having predetermined reflection characteristics with markings thereon having different reflection characteristics from those of the strip material, a compensator for momentarily holding a part of the strip material against movement, and means including a clutch member for actuating said shaping mechanism and said compensator in timed relation, a releasing device for said clutch member and means for actuating said releasing device including a light sensitive cell adapted to function through changes in the reflection characteristics of said strip material.

6. In a machine for preparing strip material, the combination with slitting and shaping mechanism, of a means for continuously moving strip material through the machine said strip material having predetermined reflection characteristics with markings thereon having different reflection characteristics from those of the strip material, a compensator for momentarily holding a part of the strip material against movement, and means including a clutch member for actuating said shaped mechanism and said compensator in timed relation, a releasing device for said clutch member and means for actuating said releasing device including a solenoid, a light sensitive cell and a circuit connecting said cell and solenoid, whereby said clutch may be actuated through changes in the reflection characteristics of the strip material.

7. In a machine for preparing strip material, the combination with slitting and shaping mechanism, of a means for continuously moving strip material through the machine said strip material having a surface adapted to reflect light rays with certain areas adapted to absorb light rays, compensating mechanism for momentarily holding a portion of the strip material still, a shaping device, and connections between said shaping device and the compensating mechanism, for moving these parts in timed relation, and means for operating said compensating mechanism from light rays reflected from said strip material including a light sensitive cell.

8. In a machine for preparing strip material, the combination with slitting and shaping mechanism, of a means for continuously moving strip material through the machine said strip material having a surface adapted to reflect light rays with certain areas adapted to absorb light rays, compensting mechanism for momentarily holding a portion of the strip material still, a shaping device, and connections between said shaping device and the compensating mechanism, for moving these parts in timed relation, and means for operating said compensating mechanism from light rays reflected from said strip material including a light sensitive cell, a light source and a housing enclosing the cell and light source said housing having an opening permitting light to be reflected by the strip material from the light source to the light sensitive cell.

9. A method of punching opaque strip material having markings which may vary in location thereon, which comprises continuously advancing said opaque material, intermittently stopping a portion of said strip material, punching said strip material while intermittently stationary and photo-electrically controlling the stopping of the strip material by variation of the reflecting characteristics of the opaque strip material caused by said markings thereon.

10. In a machine for preparing strip material, the combination with a clutch, of mechanism controlled by said clutch for operating on the strip material a clutch control including a light sensitive cell, means for illuminating the strip material, and a circuit adapted to normally pass current through said light sensitive cell by means of light reflected to the cell by the strip material, a relay, an amplifying circuit connected to the first circuit adapted to pass current to said relay when light is not reflected to said light sensitive cell, a solenoid controlled by said relay, a supplementary circuit having contacts adapted to be operated by a clutch member, and connected to said strip illuminating means a main switch for controlling a power drive for a clutch element, and means including said contacts for breaking the circuit through said main switch when the strip illuminating means fails to function.

11. In a machine for preparing strip material, the combination with a clutch, of mechanism controlled by said clutch for operating on the strip material a clutch control including a light sensitive cell, means for illuminating the strip material, and a circuit adapted to normally pass current through said light sensitive cell by means of light reflected to the cell by the strip material, a relay, an amplifying circuit connected to the first circuit adapted to pass current to said relay when light is not reflected to said light sensitive cell, a solenoid controlled by said relay, a supplementary circuit having contacts adapted to be operated by a clutch member, and connected to said strip illuminating means and to said light sensitive cell circuit, a main switch, a power drive for a clutch member controlled by said main switch, an electric stop for controlling the main switch located on the supplementary circuit, contacts in the supplementary circuit lying in the path of rotation of a clutch member and adapted to be operated thereby, said contacts being adapted to make a circuit through said contacts and operate said electric stop when a means for illuminating the strip material or when a light sensitive cell should fail to function.

HAYWOOD G. DEWEY.
ARTHUR L. SCHOEN.

CERTIFICATE OF CORRECTION.

Patent No. 1,954,349.                                                             April 10, 1934.

HAYWOOD G. DEWEY, ET AL.

It is hereby certified that error appears in the printed specification of the above numbered patent requiring correction as follows: Page 3, line 53, for the serial number "286,692" read 386,692; page 4, line 76, for "49" read 59; and that the said Letters Patent should be read with these corrections therein that the same may conform to the record of the case in the Patent Office.

Signed and sealed this 15th day of May, A. D. 1934.

Bryan M. Battey (Seal)                                          Acting Commissioner of Patents.